United States Patent
Goel et al.

(10) Patent No.: US 7,813,324 B1
(45) Date of Patent: Oct. 12, 2010

(54) SCALABLE MOBILE ADAPTIVE RELIABLE TOS BASED AUTOMATIC RETRANSMIT REQUEST

(75) Inventors: Sidharth Goel, Plano, TX (US); Alan D. Amis, Plano, TX (US); Fred D. Mabe, Marion, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 334 days.

(21) Appl. No.: 11/524,183

(22) Filed: Sep. 20, 2006

Related U.S. Application Data (63) Continuation-in-part of application No. 11/237,536, filed on Sep. 28, 2005.

(51) Int. Cl.
*H04J 3/00* (2006.01)
(52) U.S. Cl. .................. 370/336; 370/349; 370/445; 714/748
(58) Field of Classification Search ............... 370/349, 370/445; 714/748
See application file for complete search history.

(56) References Cited

U.S. PATENT DOCUMENTS

| | | | | |
|---|---|---|---|---|
| 5,717,689 A * | 2/1998 | Ayanoglu | ............ | 370/349 |
| 6,430,183 B1 * | 8/2002 | Satran et al. | ............ | 370/389 |
| 6,522,650 B1 * | 2/2003 | Yonge et al. | ............ | 370/390 |
| 6,658,619 B1 * | 12/2003 | Chen | ............ | 714/748 |

* cited by examiner

*Primary Examiner*—Lester Kincaid
*Assistant Examiner*—Charles Shedrick
(74) *Attorney, Agent, or Firm*—Matthew J. Evans; Daniel M. Barbieri (57) ABSTRACT

A method for handling data transmission errors in a wireless communication network includes receiving a first data from a first node at a second node using a data transmission protocol having a first slot for transmitting the first data. The first slot includes a plurality of bits and a first slot header comprising an acknowledgment request for at least one group of bits. The method also includes evaluating the first set of data for errors and generating a second slot using the data transmission protocol. The second slot includes at least a second slot header comprising acknowledgement data in response to the acknowledgement request. The acknowledgement data has a structure based on a Forward Error Correction (FEC) protocol block size. The second slot is then transmitted to the first node.

20 Claims, 6 Drawing Sheets

```
{
unit8   ver
unit16  netTimeStampMsb;
octetSequence[varSiz]srcAddress;
octetSequece[varSize]destAddress;
unit16  totalMsglength;
unit16  userPayloadOffset;

unit8   option_content;         — 302

```
{
unit8   ver
unit16  netTimeStampMsb;
octetSequence[varSiz]srcAddress;
octetSequece[varSize]destAddress;
unit16  totalMsglength;
unit16  userPayloadOffset;
                        — 304
unit8    length;        — 306
unit3    type; = 1;
varSize  ackDestAddress;
varSize  nextExpectedSlot;   308
varSize  ackBitMap;
                    310
              312
}
```

SCALABLE MOBILE ADAPTIVE RELIABLE TOS BASED AUTOMATIC RETRANSMIT REQUEST

CROSS REFERENCE TO RELATED PATENT APPLICATIONS

This application is a continuation-in-part of U.S. patent application Ser. No. 11/237,536, entitled "Scalable Mobile Adaptive Reliable ToS Based Automatic Retransmit Request," filed on Sep. 28, 2005, herein incorporated by reference in its entirety.

FIELD OF THE INVENTION

The present invention relates generally to communications networks and in particular, to providing scalable end to end reliable transmission of data between nodes in a wireless communication network using a scalable mobile adaptive reliable ToS based automatic retransmit request (ARQ).

BACKGROUND OF THE INVENTION

Wireless communication networks may be used for numerous applications including tactical military and commercial applications. Tactical military and commercial application require self-organizing, wireless networks that can operate in dynamic environments and provide peer-to-peer, multi-hop, multi-media communications. A structured wireless channel access scheme such as Time Division Multiple Access (TDMA) may be used in an ad hoc wireless network. TDMA is a channel access technique in which a frequency channel is divided into time slots and each time slot is assigned to a user. Accordingly, multiple transmissions may be supported on a single frequency channel. Multiple channels may be used in an ad hoc wireless network to allow simultaneous communication of neighboring nodes. A multi-channel (or multi-frequency) TDMA access scheme such as Orthogonal Domain Multiple Access (ODMA) may be utilized to support multiple channels.

Nodes in a wireless communication network (e.g., a commercial wireless network, a military wireless network, etc.) are configured to transmit and receive data using various communication protocols. During transmission and reception of packets of data, errors may occur, for example, a packet of data may be lost or data may be corrupted. Various protocols have been developed to handle communication errors and provide end to end reliability of data. For example, the Transmission Control Protocol (TCP) is the reliable transport protocol within the TCP/IP protocol. TCP is used to provide end to end reliability at higher layers. Wireless networks, however, have very limited bandwidth and TCP does not scale well in highly congested and error prone wireless networks. In addition, the overhead associated with TCP may be very high. Various protocols have been proposed that provide TCP like behavior at the Link Layer but these protocols do not scale well and do not dynamically adjust to changing wireless network conditions. In addition, these protocols may not provide priority to packets that are considered high priority and may have latency issues.

A standard method of handling communications errors is the Automatic Retransmit Request (ARQ) protocol. ARQ is an error control method in which the receiver node detects transmission errors in a message and automatically requests a retransmission from the transmitter. Three types of standard ARQ are Stop-and-Wait, Go-Back-N and Selective Repeat. In the Link Layer, these ARQ methods are implemented at the Logical Link Control (LLC) and are Link Layer frame dependent. A problem may occur in this implementation, however, when the Link Layer Protocol Data Unit (LPDU) is fragmented (e.g., a cell) to meet the Maximum Transmission Unit (MTU) of the media (e.g., a TDMA slot). Another problem with standard ARQ methods is that if cells are routed independently and cell(s) are lost, the standard ARQ methods have potentially large delays at the receiving peer LLC. Standard ARQ methods also may not account for duplicated cells that need to be deleted on a hop-by-hop basis (when using cell relay) to ensure that bandwidth is not wasted in an error prone congested network. Standard ARQ methods also may not take into consideration effects of the Forward Error Correction (FEC) block size on the ARQ. In addition, standard ARQ methods typically treat all transmission equally and do not provide priority based retransmissions.

Accordingly, there is a need to provide scalable end-to-end reliable transmissions in a wireless network by providing a priority based adaptive ARQ. There is also a need for providing an ARQ that dynamically adjusts to wireless network conditions by adjusting the retransmission timer and timeouts. There is also a need to provide an ARQ that dynamically adjusts the Acknowledgement Code (ACK)/Negative Acknowledgement Code (NAK) granularity based on wireless transmission reliability. Further, there is a need to provide a scalable mobile adaptive reliable ToS based ARQ.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

In accordance with an embodiment, a method for handling data transmission errors in a wireless communication network includes transmitting a first data from a first node to a second node using a data transmission protocol having a first slot for transmitting at least a portion of the first data, the first slot including a plurality of bits and a slot header comprising an acknowledgement request for at least one group of bits in the slot and receiving a second slot at the first node from the second node using the data transmission protocol, the second slot including a slot header comprising acknowledgement data in response to the acknowledgement request, the acknowledgement data having a structure based on a Forward Error Correction (FEC) protocol block size.

In accordance with another embodiment, a method for handling data transmission errors in a wireless communication network includes receiving a first data from a first node at a second node using a data transmission protocol having a first slot for transmitting the first data, the first slot including a plurality of bits and a slot header comprising an acknowledgement request associated with at least one group of bits in the slot, evaluating the plurality of bits for errors, generating a second slot using the data transmission protocol, the second slot including at least a slot header comprising acknowledgement data in response to the acknowledgement request, the acknowledgement data having a structure based on a Forward Error Correction (FEC) protocol block size and transmitting the second slot to the first node.

BRIEF DESCRIPTION OF THE DRAWINGS

The invention will be more readily understood by reference to the following description taken with the accompanying drawings, in which.

DETAILED DESCRIPTION OF THE PREFERRED EMBODIMENTS

Figure 1:
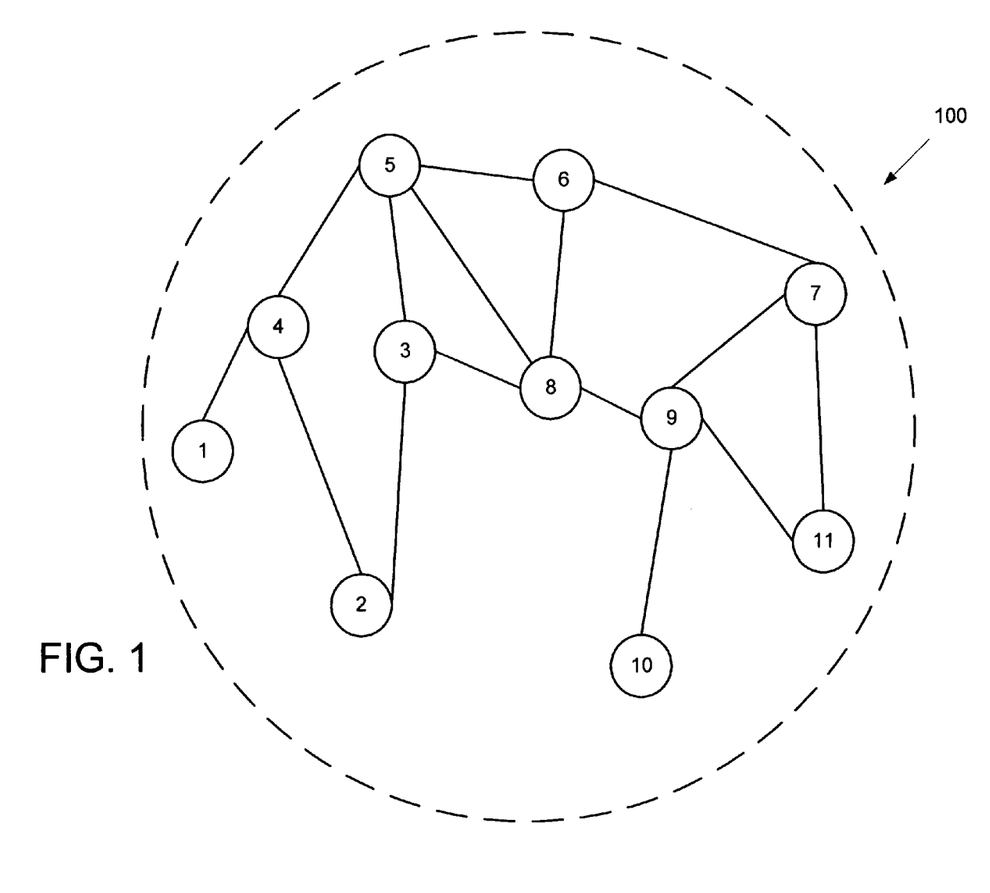
FIG. 1 is a diagram of a wireless communication network having a plurality of nodes in accordance with an embodiment.

FIG. 1 is a diagram of a wireless communication network 100 including a plurality of nodes in accordance with an embodiment. In an exemplary embodiment, wireless communication network 100 may be a Joint Tactical Radio System (JTRS) or other ad hoc wireless network. It should be understood, however, that the systems and methods described herein may be implemented in other types of wireless communication networks. Nodes 1 through 11 in network 100 may be, for example, a ground based node (e.g., a radio in a tank or other military vehicle), an airborne based node, a naval based node, or other appropriate platform. Each node in network 100 may be a software defined radio (SDR). Preferably, each node in network 100 communicates in accordance with a structured wireless channel access scheme such as Time Division Multiple Access or a multi-channel TDMA format such as Orthogonal Domain Multiple Access (ODMA). Slot assignments may be coordinated by a protocol such as Unifying Slot Assignment Protocol (USAP). Nodes in network 100 may be configured for unicast, broadcast or multicast communication.

Figure 2:
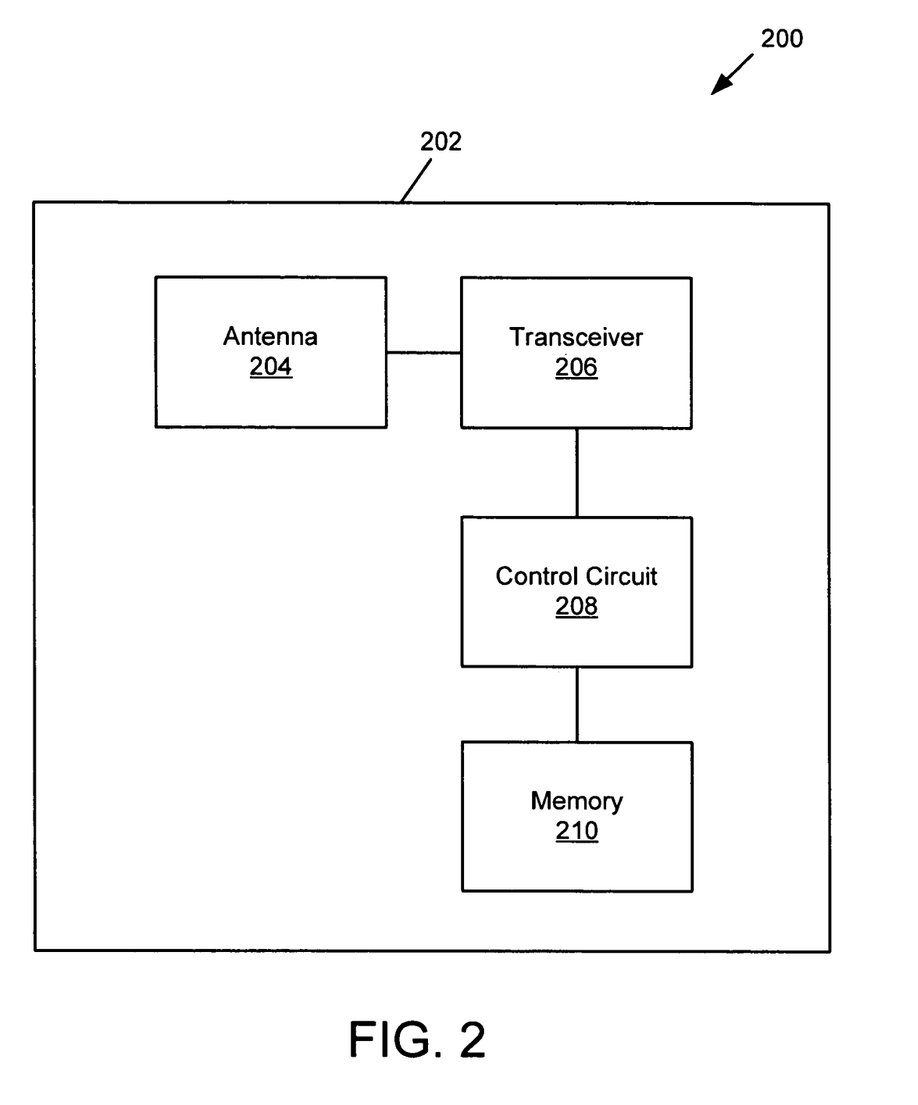
FIG. 2 is a schematic block diagram of a node for a wireless communication network in accordance with an embodiment.

FIG. 2 is a schematic block diagram of a node for a wireless communication network in accordance with an embodiment. Node 200 includes an antenna 204, a transceiver 206, a control circuit 208 and a memory 210. Transceiver 206 is coupled to antenna 204 and control circuit 208. Transceiver 206 includes transmit and receive circuitry and is configured to transmit and receive signals via antenna 204. Node 200 is configured to communicate with (e.g., receive signals from and transmit signals to) other nodes in a communication network 100 (shown in FIG. 1). Control circuit 208 is coupled to transceiver 206 and memory 210. Control circuit 208 may include various types of control circuitry, digital and/or analog, and may include a microprocessor, microcontroller, application specific integrated circuit (ASIC), or other digital and/or analog circuitry configured to perform various input/output, control, analysis, and other functions described herein. Memory 210 includes volatile and/or non-volatile memory to, for example, store a computer program or software to perform the functions described herein. Control circuit 208 may execute sequences of instructions contained in memory 210. In a preferred embodiment, node 200 is configured to communicate in an ad hoc manner using a structured wireless channel access scheme such as TDMA or multi-channel TDMA. Accordingly, control circuit 208 is configured to implement an access protocol (e.g., TDMA) in order to transmit and receive messages with other nodes via transceiver 206 and antenna 204.

Node 200 is configured to transmit and receive data messages (e.g., packets) using a data transmission protocol, e.g., TCP/IP. Node 200 may be configured to operate a protocol configured for unicast, multicast or broadcast transmissions. Control circuit 208 is further configured to implement an error control method for data transmissions. In particular, a scalable and adaptive Automatic Retransmit (or Repeat) Request (ARQ) method (described further below) is implemented in node 200 in order to provide scalable end to end reliable transmissions. The scalable and adaptive ARQ is based on a forward Error Correction (FEC) protocol block size. The scalable and adaptive ARQ is configured to dynamically adjust to wireless conditions by adjusting retransmission timers and timeouts. In addition, the acknowledgement code (ACK)/negative acknowledgement code (NAK) granularity is dynamically adjusted based on wireless transmission reliability. In one embodiment, each node in a network 100 (shown in FIG. 1) is configured to implement the scalable and adaptive ARQ as described further below.

Preferably, the scalable and adaptive ARQ is accomplished at the Media Access Control (MAC) layer of the data transmission protocol. The MAC layer controls access to the physical layer. In the MAC layer, slots are numbered and each slot includes a group of data link frames (or cells). Each slot includes a slot header that is configured to optionally (i.e., when necessary) include additional (e.g., piggybacked) information to implement a scalable and adaptive ARQ. The additional ARQ information may be included in a slot header when a cell, cells, or any grouping of bytes in a slot transmitted or received by a node require acknowledgement. Preferably, the additional ARQ information is only included in a slot header when acknowledgement of a cell, cells, or grouping of bytes is required.

Figure 3A:
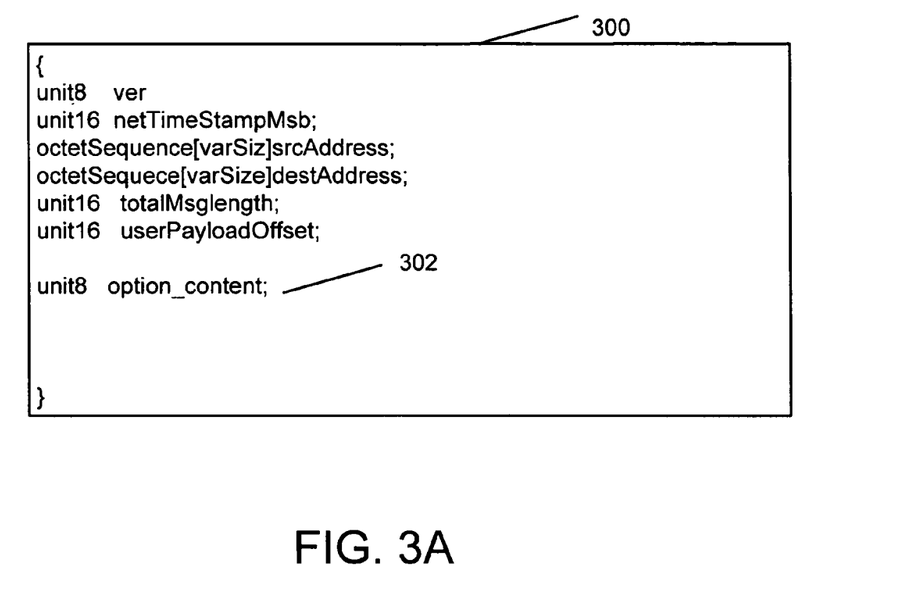
FIGS. 3A and 3B illustrate an exemplary slot header format configured to implement a scalable and adaptive ARQ in accordance with an embodiment.
Figure 3B:
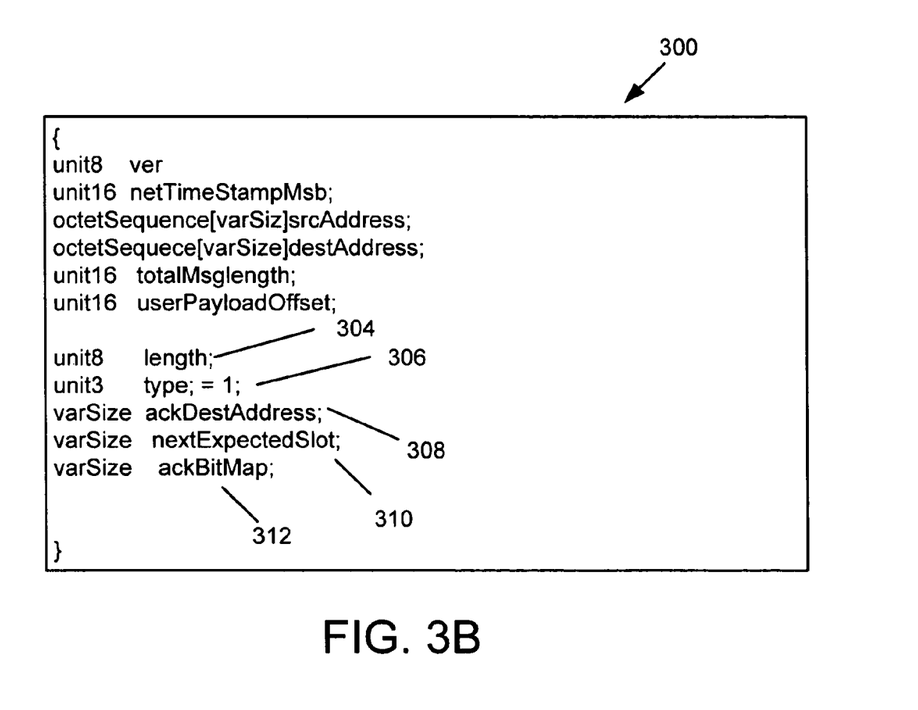

FIGS. 3A and 3B illustrate an exemplary slot header format or data structure configured to implement a scalable and adaptive ARQ in accordance with an embodiment. In FIG. 3A, the slot header includes an option content field 302 (option_content) used to incorporate the scalable and adaptive ARQ. The option content field identifies the contents of a optional portion of the slot header used to implement the ARQ. As mentioned above, preferably, the additional ARQ information is only included in the header when acknowledgement is required for slots (e.g., for cells or groups of bytes in a slot) being communicated between nodes. In an exemplary embodiment, there are three options: 1) a request for acknowledgement (RACK); 2) an acknowledgement/negative acknowledgement (ACK/NAK); and 3) a window synchronization (SYNC). The request for acknowledgement is transmitted in the options field to request an acknowledgement for a slot or for a cell or cells within the slot, or for other groupings of bytes within the slot. In addition, the request may be sent by a transmitter to force a receiver to respond with an ACK/NAK. Additional fields may be included in the slot header to implement the request for acknowledgement. For example, the fields may included a length field (e.g., to indicate the total number of bytes in the RACK), a type field (e.g., to indicate the type of message such as RACK, ACK, NAK, SYNC), a destination address field (e.g., to identify the destination node that must respond to the request) and a transmission slot identifier field (e.g., to identify the slot to acknowledge or that a RACK demanded response is requested).

An acknowledgement/negative acknowledgement message (ACK/NAK) is transmitted by a node in the options field 302 in response to a previous received request for acknowledgement (RACK). Preferably, an acknowledgement code (ACK) and a negative acknowledgement code (NAK) are used to acknowledge receipt of data or slots without errors or to indicate a message was incorrectly received or not received, respectively. The ACK/NAK is sent by the receiver node to acknowledge slots received or not received by the receiver node. Preferably, the acknowledgement is transmitted in the next available transmit opportunity to the node which is the source of the request for acknowledgement. The next transmit opportunity may be a slot with data (or payload) or may be a slot with only the ACK/NAK in the slot header. FIG. 3B illustrates an exemplary slot header format or data structure. In FIG. 3B, field 304, the "length" field, indicates the total number of bytes in the ACK/NAK message. A "type" field 306 indicates the type of message (e.g., ACK/NAK, RACK, SYNC), for example, type equal to one (1) may be used to indicate an ACK/NAK message. An acknowledge destination address field (ackDestAddress) 308 is used to identify the source node of the request for acknowledgement. A next expected slot field (nextExpectedSlot) 310 is used to indicate the next expected slot from the source node identified in the acknowledge destination address field 308. The next expected slot field points to the last correctly received slot plus one (1) (i.e., the slot with the error) and continues to report this value until a SYNC message (described below) is received. An acknowledge bit map field 312, the "Ack_bit_map" field, is used to indicate ACK or NAK for slots following the next expected slot.

The acknowledge bit map 312 may be interpreted differently (e.g., a different mode of operation) based on the block size of a Forward Error Correction (FEC) technique implemented in node 200 (shown in FIG. 2). The FEC is an error control system that can correct corrupted data on the receiving end of a data transmission and works on fixed-size blocks of bits. Each mode of operation may define a different level of granularity of the ARQ that is based on the FEC block size. If the FEC is calculated across the whole slot and an uncorrected error is detected by the FEC in a slot that includes a RACK (i.e., the slot includes one or more cells that require ARQ), the whole slot will need to be retransmitted. If the slot does not include a RACK, the data in the slot will not need to be retransmitted. If the FEC block size matches the cell size, only cells in error which require ARQ will need to be retransmitted. If the FEC block size is greater than a cell but less than a full slot, however, and an error occurs in the FEC block, all cells in the FEC block which require ARQ will need to be retransmitted.

In one embodiment, the mode of operation (i.e., how to interpret the information in the bit map 312) of a node is predetermined and no additional fields are included in the slot header to indicate the mode of operation. In an alternative embodiment, a "mode" field (not shown) may be included in the slot header to indicate the mode of operation. The mode field may be, for example, a single bit or may include additional bits to support additional modes of operation.

In an exemplary embodiment, there are three modes of operation. In a first mode of the ARQ (e.g., mode zero (0) where the FEC block size is equivalent to a cell), the bits in the bit map field represent the ACK/NAK for each individual cell transmitted in a slot, i.e., each bit in the ACK bit map field represents a single cell. In a second mode (e.g., mode one (1)), each bit in the bit map field represents an ACK/NAK for each group of cells transmitted on a slot, i.e., a group has a predetermined number of cells that have an ACK/NAK represented by a single bit in the bit map. Preferably, the number of cells in a group is an integer multiple of the FEC block size. The values for the number of cells in a slot and the number of cells in a group (i.e., the number of cells per ACK) may be designated in a communications plan (COMPLAN). The bit map size is determined based on the values for the number of cells in a slot and the number of cells per ACK. The second mode may be used when the FEC block size is greater than one cell but less than a full slot or when the number of cells in a slot exceeds the number of bits in the bit map field ("Ack_bit_map). In a third mode (e.g., mode two (2)), each bit in the bit map represents the ACK/NAK of for a slot, i.e., the bit map represents the ACK/NAK of slots. The third mode may be used when the FEC block size equals the slot size or when ARQ is only required on a slot basis.

The window synchronization (SYNC) message is used to align the transmission slot window with the receive slot window. The SYNC message may be transmitted by a node when, for example, the link between nodes becomes active, when an ACK/NAK is received which acknowledges (positively or negatively) slots, when the source node of an acknowledgement request cancels the acknowledgement request, or when an error condition occurs. Additional fields may be included in the slot header to implement a window synchronization message, such as a length field (e.g., to indicate the number of bytes in the SYNC message), a type field (e.g., to indicate the type of message such as ACK/NAK, RACK or SYNC), a destination address field (e.g., to identify the destination node which must synchronize its receive window with its transmit window peer) and a transmit window being slot field.

Figure 4:
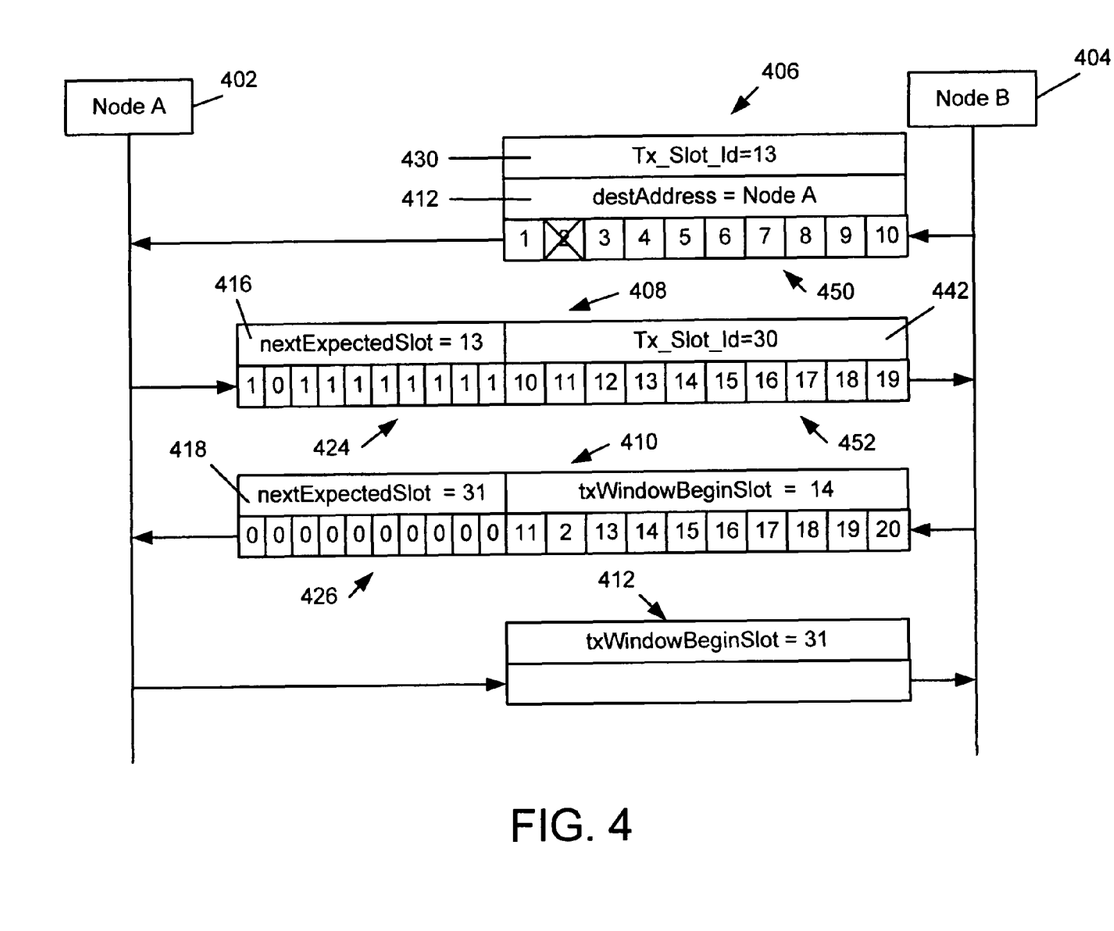
FIG. 4 illustrates a first mode of operation for an ACK/NAK process in accordance with an embodiment.
Figure 5:
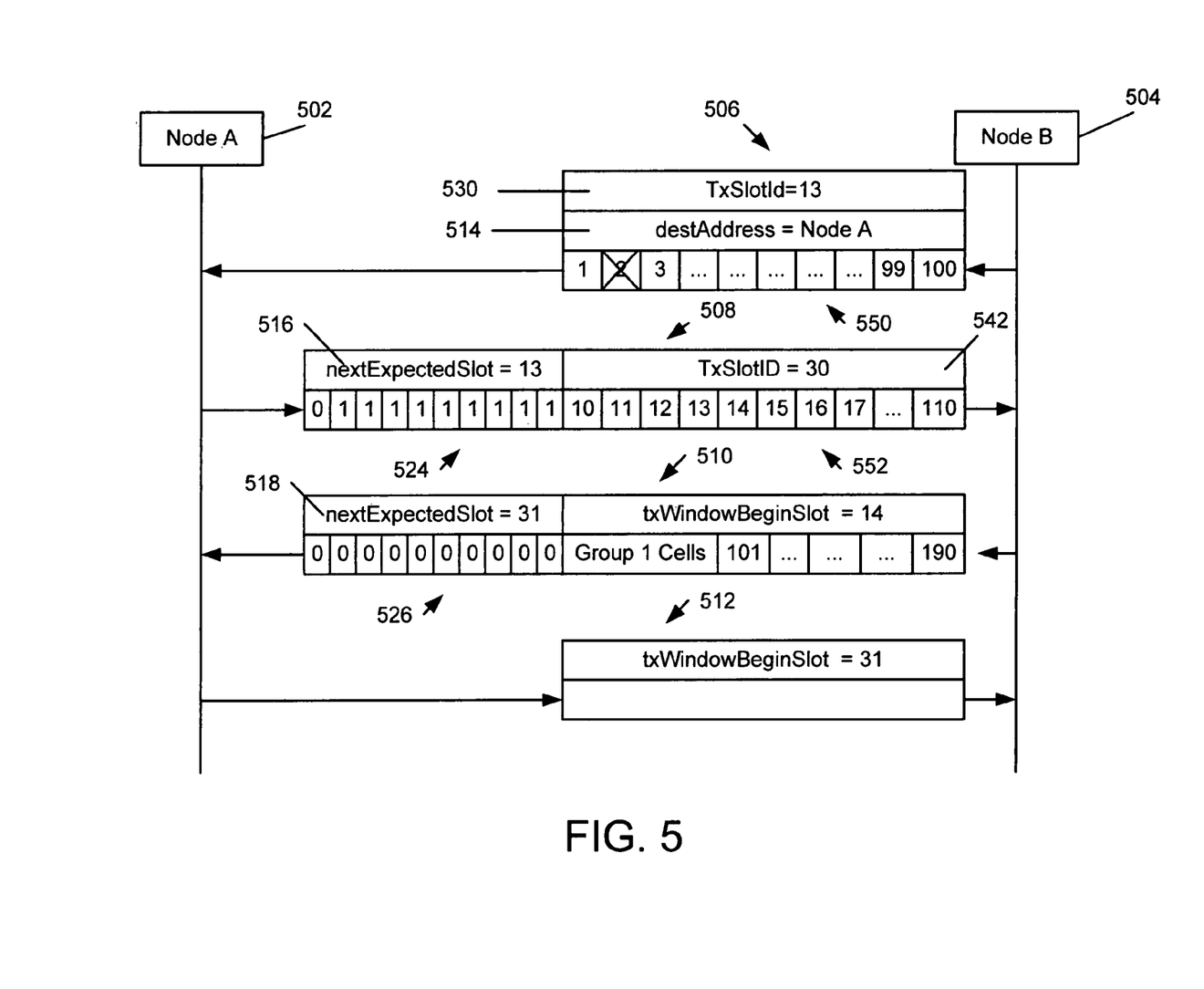
FIG. 5 illustrates a second mode of operation for an ACK/NAK process in accordance with an embodiment.
Figure 6:
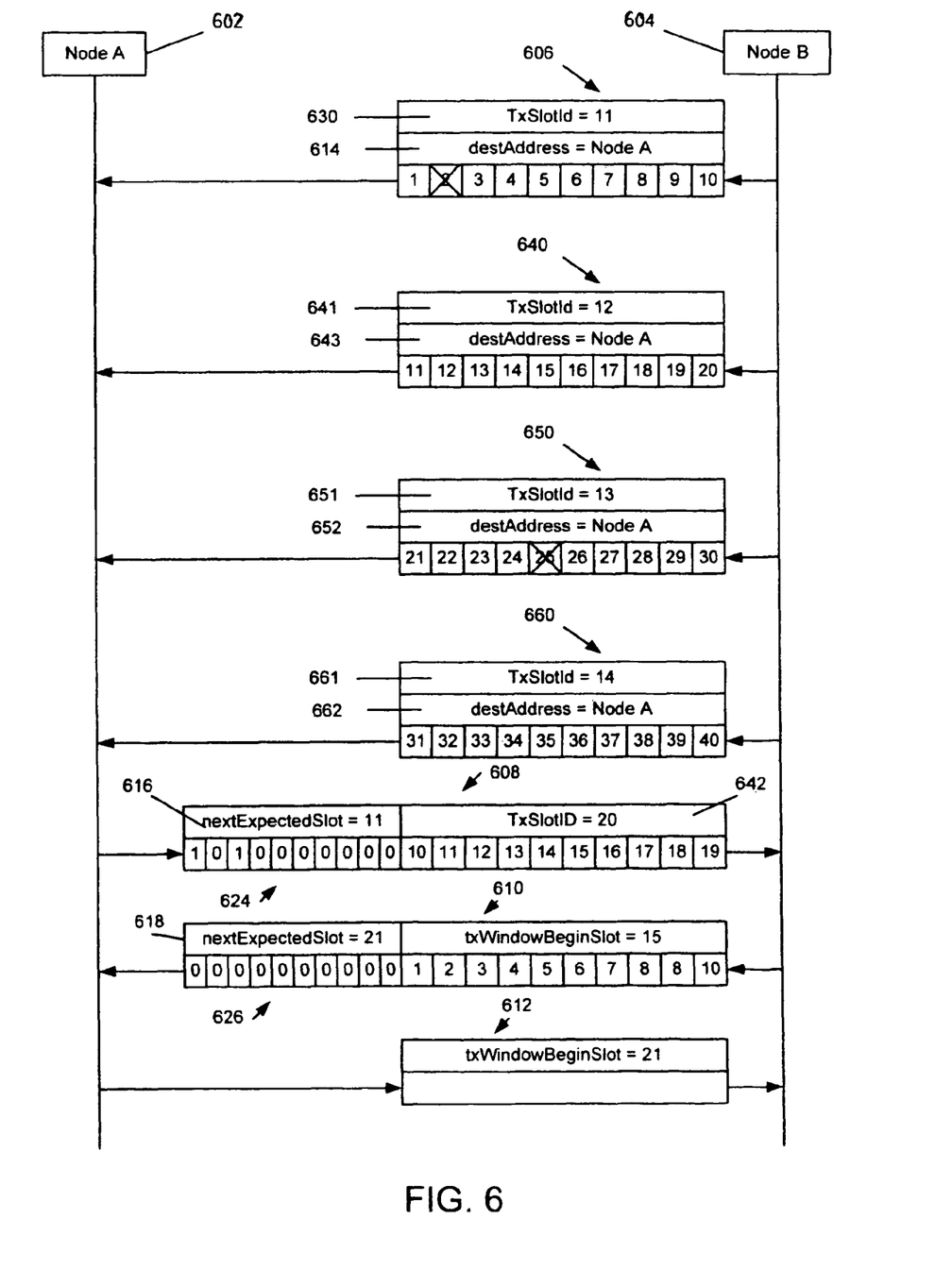
FIG. 6 illustrates a third mode of operation for an ACK/NAK process in accordance with an embodiment.

FIGS. 4 through 6 illustrate various exemplary modes of operation for the scalable and adaptive ARQ. While the following examples are described in terms of communication between two nodes in a unicast transmission, it should be understood that the methods described herein may be applied to broadcast and multicast communications, as described further below. In addition, the ARQ mechanism described below with respect to FIGS. 4 through 6 may be used with slots that include both reliable and unreliable cells (or groups of bits). Cells (or groups of bits) may be designated for reliable transmission based on Differentiated Services (DiffServ) code points.

FIG. 4 illustrates a first mode of operation for an ACK/NAK process in accordance with an embodiment. In the first mode of operation, the FEC block size matches the cell size (or other grouping of bytes identified by the link layer as requiring acknowledgement) and each bit in the ACK/NAK bit map represents a single cell in the slot. In addition, cells in error that require acknowledgement may be retransmitted. In FIG. 4, Node B 404 sends a slot 406 with a group of ten cells 450 (i.e., cells 1-10) to Node A 402. In the cells 450 of slot 406, cell 2 is corrupted and requires acknowledgement. Node B identifies the slot 406 as including a cell requiring acknowledgement using the slot identification field 430, e.g., TxSlotId=13. The destination address associated with node A is provided in a destination address field 414. The next time Node A has a transmit opportunity to Node B, an acknowledgement message (ACK/NAK) is sent, for example, and ACK/NAK may be piggybacked with data sent in slot 408 from Node A to Node B. As shown in FIG. 4, Node A sends a slot 408 with a group of ten cells 452 to Node B. In slot 408, Node A indicates that the slot 406 (i.e., slot 13) was not correctly received by indicating the next expected slot is slot 13 in the field 416, e.g., nextExpectedSlot=13. In slot 408, Node A is also able to negatively and positively acknowledge the last received slot (i.e., slot 406) requiring acknowledgement using the acknowledge bit map 424. For example, the second bit of the ACK bit map 424 in slot 408 may be set to zero (0) to indicate a negative acknowledgement (NAK) of cell 2 in slot 406. The remaining cells of slot 406 are positively acknowledged in slot 408 via the bitmap 424, e.g., the remaining bits may be set to one (1) to indicate a positive acknowledgement (ACK) of the remaining cells.

Slot 408 sent from Node A to Node B also requires acknowledgement. Node A identifies slot 408 as requiring acknowledgement using the slot identification field 442 (e.g., TxSlotId=30). In the next transmit opportunity from Node B to Node A (e.g., slot 410), Node B includes an ACK/NAK message that acknowledges the successful receipt of slot 408 (i.e., slot 30) using the next expected slot field 418 indicating that the next expected slot is slot 31 (e.g., nextExpectedSlot=31). In slot 410, Node B is also able to positively acknowledge slot 408 via the bitmap 426. For example, the bits of bitmap 426 may be set to one (1) to indicate a n acknowledgement of cells 10-19. In addition, Node B may retransmit the negatively acknowledged cell (i.e., cell 2) from slot 406 to Node A in slot 410. The next time Node A has a transmit opportunity, e.g., slot 412, that is destined for Node B, Node A transmits a SYNC message in slot 412 (i.e., txWindowBeginSlot=31) to acknowledge the ACK/NAK from Node B in slot 410 that slot 408 was successfully received. The SYNC message in slot 412 completes a three-way handshake between Nodes A and B.

FIG. 5 illustrates a second mode of operation for an ACK/NAK process in accordance with an embodiment. In this mode of operation, an ACK/NAK of groups of cells within a slot is supported. This approach provides a scalable solution while potentially maintaining a low data structure overhead. As mentioned above, the group ACK/NAK may be used when the FEC block size is greater than one cell but less than a full slot or when the number of cells in a slot exceeds the number of bits in the ACK bitmap field ("ackBitMap"). Node B 504 sends a slot 506 with a group of one hundred (100) cells 550 (i.e., cells 1-100) to Node A 502. Cells 550 are divided into groups of ten cells, e.g., group 1 comprises cells 1-10, group 2 comprises cells 11-20, etc. Accordingly, slot 506 includes ten groups of cells. Preferably, the groups size is selected based on the FEC block size. In slot 506, cell 2 in group 1 is corrupted and requires acknowledgement. Node B identifies the slot 506 as requiring acknowledgement using the slot identification field 530, i.e., TxSlotId=13. The destination address associated with Node A is provided in a destination field address 514. The next time Node A has a transmit opportunity to Node B, an acknowledgement (ACK/NAK) is sent, for example, an ACK/NAK may be piggybacked with data sent in slot 508 from Node A to Node B. For example, as shown in FIG. 5, Node A sends a slot 508 with a group of one hundred (100) cells 552 divided into ten groups of ten cells to Node B. In slot 508, Node A indicates that slot 506 (i.e., slot 13) was not correctly received via the field 516, e.g., nextExpectedSlot=13. In slot 508, Node A is also able to acknowledge the last received slot (e.g., slot 506) requiring acknowledgement using the acknowledge bitmap 524. For example, the first bit of the ACK bitmap 524 may be set to zero (0) to indicate a negative acknowledgement (NAK) of group 1 in slot 506 (slot 13) which includes corrupted cell 2. The remaining groups of slot 506 (slot 13) are positively acknowledged in slot 508 via the bitmap 524, e.g., the remaining bits of bitmap 524 may be set to one (1) to indicate a positive acknowledgement (ACK) of the remaining groups within the slot.

Slot 508 sent from Node A to Node B also requires acknowledgement. Node A identifies slot 508 as requiring acknowledgement using the slot identification field 542 (e.g., TxSlotId=30). In the next transmit opportunity for Node B to Node A (e.g., slot 510), Node B includes an ACK.NAK message that acknowledges the successful receipt of slot 508 (i.e., slot 30) via the field 518, e.g., nextExpectedSlot=31. In slot 510, Node B is also able to positively acknowledge the groups in slot 508 via the bitmap 526. For example, the bits of bitmap 526 may be set to one (1) to indicate a positive acknowledgement of each group in slot 508. In addition, Node B may retransmit the negatively acknowledged group (i.e., group 1) of cells from slot 506 to Node A in slot 510. The next time Node A has a transmit opportunity, e.g., slot 512, that is destined for Node B, Node A transmits a SYNC message in slot 512 (i.e., txWindowBeginSlot=31) to acknowledge the ACK/NAK from Node B in slot 510 that slot 508 was successfully received. The SYNC message in slot 512 completes a three-way handshake between Nodes A and B.

FIG. 6 illustrates a third mode of operation for an ACK/NAK process in accordance with an embodiment. In this embodiment, the ACK bit map indicates missing slots, i.e., each bit represents a slot. As discussed above, the slot based mode of operation may occur when the FEC block size equals a slot or when ARQ is only required on a slot basis. As shown in FIG. 6, Node B 604 sends four consecutive slots 606, 640, 650, and 660, each with ten (10) cells to Node A 602. In slot 606, cell 2 is corrupted and in slot 650, cell 5 is corrupted, each requiring acknowledgement. Therefore, in this mode of operation, the entire slot 606 and slot 650 requires acknowledgement (i.e., at least one cell in the slot requires acknowledgement). Node B identifies slot 606, 640, 650, and 660 as requiring acknowledgement using the slot identification field 630, 641, 651, and 661 with respective TxSlotId equal to 11, 12, 13, and 14. In the next transmission opportunity, e.g., slot 608, from Node A to Node B, Node A indicates that slot 606 was not correctly received, e.g., nextExpectedSlot=11 via the field 616. Additionally, Node A indicates to Node B via bitmap 624 that slot 640 (TxSlotId=12=11+1) and 660 (TxSlotId=14=3+11) were received correctly. In slot 608, Node A also requests acknowledgement of slot 608, e.g., TxSlotID=20. In the next transmission opportunity, e.g., slot 610, from Node B to Node A, Node B includes an ACK/NAK message that acknowledges the successful receipt of slot 608, e.g., nextExpectedSlot=21. Node B retransmits slots 606 and 650 in future slots but advances its transmit slot window indices (i.e., txWindowBeginSlot=15) completing the three-way handshake, as shown in slot 610. In the next transmission opportunity, e.g., slot 612, from Node A to Node B, Node A transmits a SYNC message in slot 612 (i.e., txWindowBeginSlot=21) to acknowledge the ACK/NAK from Node B in slot 610 that slot 608 was successfully received. The SYNC message in slot 612 completes a three-way handshake between Nodes A and B.

As mentioned above, the ARQ method described herein may be applied to broadcast and multicast communications as well as unicast communications. In one embodiment, unicast messages may be transmitted in broadcast slots (e.g., when the entire broadcast slot is not used for broadcast messages). If certain unicast messages require acknowledgement, the request for acknowledgement (RACK) in the broadcast slot header includes destination addresses for these unicast messages so that only the destination nodes of the unicast messages are required to acknowledge the slot in the next transmit opportunity.

In another embodiment, a broadcast slot may require reliable transmission. In a reliable broadcast transmission, it would be inefficient to include an identification (e.g., destAddress) in the header for every broadcast neighbor. Accordingly, in a preferred embodiment, in the request for acknowledgement (RACK) for a broadcast slot, a broadcast address is used (e.g., destAdd=FF) in order to indicate a broadcast transmission and that all neighbor nodes (e.g., 1-hop neighbors) should respond to the RACK. In the next transmit opportunity from a neighbor node, the neighbor node may acknowledge (ACK/NAK) the broadcast slot and include an indication that it is acknowledging a broadcast address (e.g., AckedAdd=FF). In yet another embodiment, a multicast slot may require reliable transmission. In a reliable multicast transmission, it would be inefficient to include an identifier (e.g., destAddress) in the header for every multicast neighbor. Accordingly, in a preferred embodiment, a multicast address is used (e.g., destAdd=FE) in the RACK in order to indicate a multicast transmission and that all neighbors assigned to the multicast group should respond to the RACK. In a next transmission from a multicast neighbor node, the multicast neighbor node may acknowledge (ACK/NAK) the multicast slot and include an indication that it is acknowledging a multicast address (e.g., AckedAdd=FE).

The scalable and adaptive ARQ is also configured to provide priority based retransmissions and to dynamically adjust retransmission timers and timeouts based on the priority of the packets. The number of retransmission retries and transmitter timeouts for a transmitter may be based on DiffServ (Differentiated Services) code points associated with each data packet and the Round Trip time (RTT). The RTT may be defined as the longest time between a transmit opportunity and a receive opportunity. In one example, the number of retransmission tries and the transmitted timeout period may be shorter for a first type of packet (e.g., a expedited flash packet) than for a second type of packet (e.g., an Assured packet). In another example, the timeout period will be shorter for a higher priority packet than for a low priority packet. In addition, the number of retries may be based on the drop precedence of the message, for example, a high drop precedence message should have a greater number of retries than a low drop precedence message.

Each time a transmitter node transmits a slot, it starts a retransmission timer. The transmitter may determine from the ACKs received that a slot of cells was not successfully received (i.e., implied NAK) and proactively cancel the existing retransmission timer and retransmit the group of cells and re-associate the retransmission with the new slot transmission. The transmitted slot identifier, e.g., TxSlotId, may be incremented so the transmitter does not retransmit the same slot ID for retransmission. When an entire slot is lost or corrupted but there is no previous ACK to use to infer an implied NAK, then the retransmission timer will expire and the cells will be retransmitted. The transmitter may transmit the cells N timed in the case of no ACK or NAKs where N is set based on the DiffServ priority of the packet. As an example, a node may transmit a particular slot three times, each time with a new slot identifier TxSlotId. If the node does not receive an ACK/NAK within three tries (based on the DiffServ code points), it gives up the transmission. In one embodiment, if an ACK is received late, i.e., after the retransmission timer expires and is then reset, the late ACK is ignored because the transmitter does not have an outstanding acknowledgement with the slot ID.

The ARQ method may also be configured to address the condition of cell accumulation. For example, if the same set of cells is received a predetermined number of time, and each time the same set of cells is corrupted, then the receiver may drop the cells. In addition, if the transmitter receives a NAK for the same set of cells a predetermined number of times (e.g., three times) in a row, the transmitter may drop the cells.

While the detailed drawings, specific examples and particular formulations given describe preferred and exemplary embodiments, they serve the purpose of illustration only. The present invention disclosed is not limited to the specific forms shown. For example, the methods may be performed in a variety of sequence of steps. The systems and methods depicted and described are not limited to the precise details and conditions disclosed. Furthermore, other substitutions, modifications, changes, and omissions may be made in the design and arrangement of the exemplary embodiments without departing from the scope of the invention as expressed in the appended claims.

What is claimed is:

1. A first node for transmitting data messages to receiving nodes, comprising:
   a transceiver;
   a control circuit configured to operate the transceiver according to an automatic retransmit request protocol for unicast, multicast, and broadcast transmissions, wherein the control circuit is configured to transmit a request for acknowledgement with a data message to indicate that one or more of the receiving nodes should acknowledge successful receipt of the data message, wherein the request for acknowledgement comprises information that indicates whether the transmission is a unicast transmission, a multicast transmission, or a broadcast transmission and also indicates which receiving nodes should respond to the request for acknowledgement, wherein when the transmission is a broadcast or multicast transmission, the information includes a broadcast address or multicast address, wherein the broadcast address or multicast address includes a setting that indicates that all neighbor nodes should respond to the request for acknowledgement, wherein the control circuit:
   receives an acknowledgement code bit map from a second node of the receiving nodes in response to the transmission of the transmitted data message, wherein the data message comprises a plurality of data cells, wherein the control circuit;
   conducts an automatic retransmit request protocol in a first mode of operation in which each bit of the acknowledgement code bit map acknowledges a single data cell;
   conducts the automatic retransmit request protocol in a second mode of operation in which each bit of a received acknowledgement code bit map acknowledges a group of data cells of a received set of data cells; and
   changes to the second mode of operation when the forward error correction protocol block size is greater than one data cell and less than the size of a full transmission slot.

2. The first node of claim 1, wherein the information that indicates whether the transmission is a unicast transmission, a multicast transmission, or a broadcast transmission and also indicates which receiving nodes should respond to the request for acknowledgement comprises a single destination address.

3. The first node of claim 2, wherein the destination address is a network address of a receiving node when the transmission is a unicast transmission.

4. The first node of claim 3, wherein the destination address is a broadcast address when the transmission is a broadcast transmission.

5. The first node of claim 4, wherein the destination address is a multicast address that identifies a previously assigned multicast group when the transmission is a multicast transmission.

6. The first node of claim 1, wherein the control circuit is configured to analyze a received transmission to determine if the received transmission is acknowledging a broadcast transmission.

7. The first node of claim 6, wherein the control circuit is configured to analyze a received transmission to determine if the received transmission is acknowledging a multicast transmission.

8. A method for transmitting data messages to receiving nodes, the method comprising:
   using a control circuit to operate a transceiver according to an automatic retransmit request protocol for unicast, multicast, and broadcast transmissions;
   transmitting a data message and a request for acknowledgement with the data message to indicate that one or more of the receiving nodes should acknowledge successful receipt of the data message, wherein the data message comprises a plurality of data cells, wherein the request for acknowledgement comprises information that indicates whether the transmitting is a unicast transmission, a multicast transmission, or a broadcast transmission and also indicates which receiving nodes should respond to the request for acknowledgement, wherein for the broadcast or multicast transmission, the information includes a broadcast address or multicast address, wherein the broadcast address or multicast includes an entry that indicates that all neighbor nodes should respond to the request for acknowledgement;
   receiving an acknowledgement code bit map from a second node of the receiving nodes in response to the transmission of the transmitted data message;
   conducting the automatic retransmit request protocol in a first mode of operation in which each bit of the acknowledgement code bit map acknowledges a single data cell; and
   conducting the automatic retransmit request protocol in a second mode of operation in which each bit of a received acknowledgement code bit map acknowledges a group of data cells of a received set of data cells; and
   changing to the second mode of operation when the forward error correction protocol block size is greater than one data cell and less than the size of a full transmission slot.

9. The method of claim 8, wherein the information that indicates whether the transmission is a unicast transmission, a multicast transmission, or a broadcast transmission also indicates which receiving nodes should respond to the request for acknowledgement comprises a single destination address.

10. The method of claim 9, wherein the destination address is a network address of a receiving node when the transmission is a unicast transmission.

11. The method of claim 10, wherein the destination address is a broadcast address when the transmission is a broadcast transmission.

12. The method of claim 11, wherein the destination address is a multicast address that identifies a previously assigned multicast group when the transmission is a multicast transmission.

13. The method of claim 8, further comprising:
   analyzing a received transmission to determine if the received transmission is acknowledging a broadcast transmission.

14. The method of claim 13, further comprising:
   analyzing a received transmission to determine if the received transmission is acknowledging a multicast transmission.

15. A method for transmitting data messages to receiving nodes, the method comprising:
   using a control circuit to operate a transceiver according to an automatic retransmit request protocol for unicast, multicast, and broadcast transmissions;
   transmitting a data message and a request for acknowledgement with the data message to indicate that one or more of the receiving nodes should acknowledge successful receipt of the data message wherein the data message comprises a plurality of data cells;
   wherein the request for acknowledgement comprises information that indicates whether the transmitting is a unicast transmission, a multicast transmission, or a broadcast transmission and also indicates which receiving nodes should respond to the request for acknowledgement;
   receiving an acknowledgement code bit map from a second node of the receiving nodes in response to the transmission of the transmitted data message;
   changing the number of data cells of the set of data cells that are acknowledged by each bit of the acknowledgment code bit map, conducting the automatic retransmit request protocol in a second mode of operation in which each bit of a received acknowledgement code bit map acknowledges a group of data cells of a received set of data cells; and
   adjusting the number of data cells in the group of data cells based on an observed wireless transmission reliability;
   conducting the automatic retransmit request protocol in a first mode of operation in which each bit of the acknowledgement code bit map acknowledges a single data cell;
   conducting the automatic retransmit request protocol in a second mode of operation in which each bit of a received acknowledgement code bit map acknowledges a group of data cells of a received set of data cells; and
   changing to the second mode of operation when the forward error correction protocol block size is greater than one data cell and less than the size of a full transmission slot.

16. A method for transmitting data messages to receiving nodes, the method comprising:
   using a control circuit to operate a transceiver according to an automatic retransmit request protocol for unicast, multicast, and broadcast transmissions;
   transmitting a data message and a request for acknowledgement with the data message to indicate that one or more of the receiving nodes should acknowledge successful receipt of the data message;
   wherein the request for acknowledgement comprises information that indicates whether the transmitting is a unicast transmission, a multicast transmission, or a broadcast transmission and also indicates which receiving nodes should respond to the request for acknowledgement;
   receiving an acknowledgement code bit map from a second node of the receiving nodes in response to the transmission of the transmitted data message;
   changing the number of data cells of the set of data cells that are acknowledged by each bit of the acknowledgment code bit map, conducting the automatic retransmit request protocol in a second mode of operation in which each bit of a received acknowledgement code bit map acknowledges a group of data cells of a received set of data cells; and
   setting the number of data cells in the group of data cells to match an integer multiple of a forward error correction protocol block size.

17. The method of claim 16 wherein the data message comprises a plurality of the data cells.

18. The method of claim 17, further comprising:
conducting the automatic retransmit request protocol in a first mode of operation in which each bit of the acknowledgement code bit map acknowledges a single data cell.

19. The method of claim 18, further comprising:
changing to the second mode of operation when the forward error correction protocol block size is greater than one data cell and less than the size of a full transmission slot.

20. A software defined radio for use in a joint tactical radio system (JTRS) network, the radio comprising:
a transceiver and
a control circuit configured to operate according to an automatic retransmit request protocol for unicast, multicast, and broadcast transmissions, wherein the control circuit is configured to transmit a request for acknowledgement with a data message to indicate that one or more of the receiving nodes should acknowledge successful receipt of the data message, wherein the request for acknowledgement comprises information that indicates whether the data message is for a unicast transmission, a multicast transmission, or a broadcast transmission and also indicates which receiving nodes should respond to the request for acknowledgement, wherein for the broadcast or multicast transmission, the information includes a broadcast address or multicast address, wherein the broadcast address or multicast address is a single address that indicates that all neighbor nodes respond to the request for acknowledgement;
wherein the control circuit receives an acknowledgement code bit map from a second node of the receiving nodes in response to the transmission of the transmitted data message, wherein the data message comprises a plurality of data cells;
wherein the control circuit conducts the automatic retransmit request protocol in a first mode of operation in which each bit of the acknowledgement code bit map acknowledges a single data cell; and
wherein the control circuit conducts the automatic retransmit request protocol in a second mode of operation in which each bit of a received acknowledgement code bit map acknowledges a group of data cells of a received set of data cells; and
changes to the second mode of operation when the forward error correction protocol block size is greater than one data cell and less than the size of a full transmission slot.

* * * * *